(12) United States Patent
Padwick et al.

(10) Patent No.: US 7,715,651 B2
(45) Date of Patent: May 11, 2010

(54) METHOD AND APPARATUS FOR ENHANCING A DIGITAL IMAGE

(75) Inventors: Chris Padwick, Longmont, CO (US);
Jack F. Paris, Longmont, CO (US)

(73) Assignee: DigitalGlobe, Inc., Longmont, CO (US)

( * ) Notice: Subject to any disclaimer, the term of this patent is extended or adjusted under 35 U.S.C. 154(b) by 0 days.

(21) Appl. No.: 12/463,797

(22) Filed: May 11, 2009

(65) Prior Publication Data
US 2009/0219407 A1    Sep. 3, 2009

Related U.S. Application Data

(63) Continuation of application No. 10/905,042, filed on Dec. 13, 2004, now abandoned.

(51) Int. Cl.
*G06K 9/36* (2006.01)
*G06K 9/00* (2006.01)
*H04N 9/74* (2006.01)

(52) U.S. Cl. ................... 382/284; 382/110; 348/578
(58) Field of Classification Search ............ 382/254, 382/284
See application file for complete search history.

(56) References Cited

U.S. PATENT DOCUMENTS

| | | | |
|---|---|---|---|
| 4,682,300 A | 7/1987 | Seto et al. | |
| 4,688,092 A | 8/1987 | Kamel et al. | |
| 5,884,226 A | 3/1999 | Anderson et al. | |
| 6,023,291 A | 2/2000 | Kamel et al. | |
| 6,470,265 B1 | 10/2002 | Tanaka | |
| 6,504,502 B1 | 1/2003 | Wu et al. | |
| 6,584,405 B1 | 6/2003 | Moncet | |
| 6,587,575 B1 * | 7/2003 | Windham et al. | 382/110 |
| 6,694,064 B1 * | 2/2004 | Benkelman | 382/284 |
| 6,810,153 B2 | 10/2004 | Komural et al. | |
| 6,819,798 B2 | 11/2004 | Gorin | |
| 6,834,125 B2 | 12/2004 | Woodell et al. | |
| 6,909,815 B2 | 6/2005 | Bernstein et al. | |
| 6,921,898 B1 | 7/2005 | Chen | |
| 2002/0012071 A1 * | 1/2002 | Sun | 348/578 |

(Continued)

OTHER PUBLICATIONS

Buchwitz et al., "A correlated-k distribution scheme for overlapping gases suitable for retrieval of atmospheric constituents from moderate resolution radiance measurements in the visible/near-infrared spectral region", J. Geophys. Res., 105, 15 247-15 262, 2000.

(Continued)

*Primary Examiner*—Bhavesh M Mehta
*Assistant Examiner*—Hadi Akhavannik
(74) *Attorney, Agent, or Firm*—Paul, Hastings, Janofsky & Walker LLP

(57) ABSTRACT

A system and method processes original digital numbers (DNs) provided by a satellite imaging system to produce a set of spectral balanced and contrast enhanced multispectral images. Spectral balancing is achieved based on physical characteristics of sensors of the imaging system as well as compensation for atmospheric effects. The DNs in the multispectral bands may be processed using a relatively small amount of processing resources otherwise required to produce such images. Such images may be processed completely automatically and provide relatively easy visual interpretation. Each image pixel may be, for example, in an 8-bit or 16-bit format, and the image may be displayed and/or printed without applying any additional color correction and/or contrast stretches.

16 Claims, 6 Drawing Sheets

U.S. PATENT DOCUMENTS

| | | | |
|---|---|---|---|
| 2002/0041328 | A1 | 4/2002 | Lecompte et al. |
| 2003/0044085 | A1 | 3/2003 | Dial, Jr. et al. |
| 2003/0152292 | A1 | 8/2003 | Scott et al. |
| 2004/0120595 | A1 | 6/2004 | Choi et al. |
| 2004/0153284 | A1 | 8/2004 | Bernstein et al. |
| 2004/0264796 | A1 | 12/2004 | Turner et al. |
| 2006/0041375 | A1 | 2/2006 | Witmer et al. |
| 2006/0126959 | A1 | 6/2006 | Padwick et al. |

OTHER PUBLICATIONS

Eismann et al., "Application of the stochastic mixing model to hyperspectral resolution enhancement", IEEE Trans. Geosci. Remote Sens., vol. 42, No. 9, pp. 1924-1933, Sep. 2004.

Friedmann et al., "Multiple scene precision rectification of spaceborne imagery with very few control points", 1983, Photogrammetric Engineering and Remote Sensing, 49(12), pp. 1657-1667.

Higgs et al., "Operational Pass Processing of Landsat TM and SPOT HRV Imagery within the Canadian CEODesk Processor",In Proceedings of the Technical Commission II: Systems for data processing, analysis and representation, Cambridge, ISPRS, 1998.

Schott et al., "Incorporation of time-dependent thermodynamic model and radiation model into infrared three-dimensional synthetic image generation", Opt. Eng., vol. 37, No. 7, p. 1505, Jul. 1992.

Sharpe et al., "Reduction of ground control requirements by pass processing", In Proceedings of the XVI International Congress of the ISPRS, 1988, vol. 27, Part B4, pp. 350-357.

Sharpe et al., " Reduction of ground control requirements for SPOT imagery by pass processing",In Proceedings of IGARSS, 1989, vol. 1, pp. 142-145.

International Search Report and Written Opinion from Application No. PCT/US05/046749 dated Nov. 29, 2006.

International Search Report and Written Opinion from Application No. SG200608775-3 dated Jan. 25, 2008.

International Search Report and Written Opinion from Application No. SG200608775-3 dated Sep. 24, 2008.

Non-final Office Action from U.S. Appl. No. 10/905,042 mailed Nov. 12, 2008.

International Preliminary Report on Patentability from Application No. PCT/US05/046749 dated Jan. 10, 2008.

International Search Report and Written Opinion from Application No. PCT/US05/022961 dated Oct. 30, 2007.

Non-final Office Action from U.S. Appl. No. 10/908,695 mailed Mar. 13, 2009.

Non-final Office Action from U.S. Appl. No. 11/571,293 mailed Aug. 13, 2008.

Non-final Office Action from U.S. Appl. No. 11/571,293 mailed Dec. 30, 2008.

Padwick. C., et al., "Automatic Contrast Enhancement of QuickBird Imagery", Jun. 10, 2004, presented at ASPRS annual meeting.

DigitalGlobe Tech Notes, Jun. 10, 2004.

* cited by examiner

METHOD AND APPARATUS FOR ENHANCING A DIGITAL IMAGE

RELATED APPLICATIONS

This application is a continuation of U.S. patent application Ser. No. 10/905,042, filed Dec. 13, 2004.

FIELD OF THE INVENTION

The present invention is directed to enhancing digital images, and, more specifically, to enhancing color and contrast in a multispectral digital image obtained from a remote sensing platform.

BACKGROUND

In a generalized way, a digital image is a set of one or more two-dimensional numeric arrays in which each array element, or pixel, represents an apparent brightness measured by an imaging sensor. The brightness value at each pixel is often represented by an integer number called a digital number (DN). Digital images are commonly generated by remote imaging systems that collect imagery in the visible and infrared regions of the electromagnetic spectrum. Images collected from such systems are used in numerous applications by both commercial and government customers.

When collecting digital imagery, specific bands of electromagnetic energy from the area being imaged are commonly collected at several imaging sensors. For example, in many imaging systems, several spectral bands of electromagnetic energy are collected at imaging sensors, such as, a red light band, a green light band, a blue light band, and a near infrared band. Imaging systems may also include other spectral bands within the visible bands and/or within the middle infrared (a.k.a., shortwave infrared) bands. An image generated from such a system is referred to as a multispectral digital image. In such a case, a set of DN values exist for each line and column position in the multispectral digital image with one DN value allocated to each spectral band. Each DN represents the relative brightness of an image in the associated spectral band at the associated pixel location in the image. When generating a multispectral digital image, data from the imaging sensors is collected, processed, and images are produced. Images are commonly provided to customers as a multispectral image file containing imagery from each of the spectral bands. Each band includes DNs on, for example, an 8-bit or 11-bit radiometric brightness scale representing the radiance collected at the respective sensor for an area of the scene imaged. Several methods exist for processing data from each band to generate an image that is useful for the application required by a user. The data is processed in order to provide an image that has accurate color and contrast for features within the image.

The DN values generated from a particular imaging sensor have limited range that varies from image source to image source according to the associated bit depth. Commonly used bit depths are 8 bits and 11 bits, resulting in DNs that range from 0 to 255 and 0 to 2047, respectively. Digital images are generally stored in raster files or as raster arrays in computer memory, and since rasters use bit depths that are simple powers of base 2, image DNs may be stored in rasters having 1, 2, 4, 8, or 16 bits, with 8 bit and 16 bit being most common. It is common practice to reserve special DN values to represent non-existent image data (e.g., 0, 255, and/or 2047). The corresponding pixels are called blackfill. Actual image data will then have DNs between 1 and 254 or between 1 and 2046.

Digital images, following collection by an imaging system, are commonly enhanced. Enhancement, in the context of a digital image, is a process whereby source-image DNs are transformed into new DNs that have added value in terms of their subsequent use. Commonly, the data from each band of imagery is enhanced based on known sensor and atmospheric characteristics in order to provide an adjusted color for each band. The image is then contrast stretched, in order to provide enhanced visual contrast between features within the image. Commonly, when performing the contrast stretch, the average radiance from each pixel within a particular band is placed in a histogram, and the distribution of the histogram is stretched to the full range of DNs available for the pixels. For example, if each band includes DNs on an 8-bit radiometric brightness scale, this represents a range of DNs between 0 and 255. The DNs from a scene may then be adjusted to use this full range of possible DN values, and/or the DNs from a scene may be adjusted to obtain a distribution of DNs that is centered about the mid-point of possible DN values. Generally speaking, the visual quality of the contrast stretch achieved using normal contrast stretch algorithms is highly dependent on scene content. Many contrast stretch algorithms change the color content of the imagery resulting in questionable color content in the scene. For example, if the distribution of DNs is not centered within the range of possible DN values, such a contrast stretch can skew the DNs resulting in a color offset and, in an image containing structures, a house may appear as being the wrong color. In addition it is often difficult to decide what stretch to apply to a given image. A user often balances the trade-offs between acceptable contrast and acceptable color balance when choosing a Commercial Off The Shelf (COTS) stretch to apply to a given image. While useful in applications where users may be accustomed to color distortion, in applications where a user is not accustomed to such a color skew, it may result in customer dissatisfaction for applications where users are not accustomed to such a color skew. For example, an employee of a firm specializing in the analysis of digital imagery may be accustomed to such a color skew, while a private individual seeking to purchase a satellite image of an earth location of interest to them may find such a color skew unacceptable.

Other methods for enhancing contrast in digital images may be used that preserve the color of the image. While such methods preserve color, they are generally quite computer intensive and require significant amounts of additional processing as compared with a contrast stretch as described above. For example, due to inadequacies in COTS stretch algorithms, images may be stretched manually by manipulating image histograms to achieve the desired result. This can be a very time-consuming, labor-intensive process. Another method of performing a color preserving contrast stretch follows three steps. First, a processing system converts RGB data to a Hue Intensity Saturation (HIS) color space. Next, a contrast stretch is applied to the I (Intensity) channel within the HIS color space. Finally, the modified HIS is converted back to the RGB color space. By adjusting the Intensity channel in the HIS color space, the brightness of the image is enhanced while maintaining the hue and saturation. The image in the RGB color space thus has enhanced contrast while maintaining color balance. This technique is reliable, however, it requires significant additional processing as compared to a contrast stretch performed on RGB data as previously described. A major drawback to this type of stretch involves the significant amounts of computer processing time involved in converting from RGB to HIS space and back.

SUMMARY OF THE INVENTION

The present invention provides a system and method to process original DNs provided by a satellite imaging system to produce a set of color balanced and contrast enhanced images. The present invention enhances a multispectral digital image in a fully-automatic, systematic, and universal way, allows for the production of optimized enhanced digital image products that are cost effective and profitable, and also produces a set of quantitative surface-reflectance estimates that can be further processed by other automatic algorithms to yield specific kinds of information about the objects that have been imaged. The set of color balanced and contrast enhanced images is referred to herein as Dynamic Range Adjusted (DRA) images. The DNs in the multispectral bands may be processed using a relatively small amount of processing resources otherwise required to produce such images. Such DRA products provide relatively easy visual interpretation, and may include images in which each pixel is in an 8-bit format, four-band 8-bit or 24-bit RGB. The image may be displayed and/or printed without applying any additional contrast stretches.

In one embodiment, a method is provided for producing an enhanced digital image, the method comprising: receiving a plurality of pixels of imaging data from an imaging sensor, each of the pixels of imaging data comprising a digital number; processing the digital number of each of the pixels to determine a distribution of imaging data for the plurality of pixels, and determining the spectral radiance at top of atmosphere (TOA) of each of the plurality of pixels based on the distribution. The receiving step, in one embodiment, comprises receiving a plurality of bands of pixels of imaging data from a plurality of imaging sensors. The plurality of imaging sensors may include a blue band imaging sensor, a green band imaging sensor, a red band imaging sensor, and a near-infrared band imaging sensor. In another embodiment, the receiving step comprises receiving a plurality of top-of-atmosphere pixels of imaging data from the imaging sensors, the top-of-atmosphere pixels comprising a top-of-atmosphere digital number, and adjusting the top-of-atmosphere digital numbers based on known sensor characteristics of the imaging sensors. The step of determining a spectral radiance step may be performed independently of scene content of the digital image, and may be performed on a physical basis of the imaging data, rather than a purely statistical basis.

When processing the digital number, a lower distribution cutoff of said distribution of imaging data may be determined. The lower distribution cutoff, in an embodiment, is set at 0.1% of the cumulative distribution. In another embodiment, the lower distribution cutoff is based on a point in the cumulative distribution at which the digital numbers are indicative of the spectral radiance of the atmospheric path, hereinafter referred to as "path radiance." When the lower distribution cutoff is determined, the method may further include subtracting a digital number associated with the lower distribution cutoff from each of the plurality of pixels of imaging data. In another embodiment, the method includes determining the value of a digital number associated with the lower distribution cutoff and subtracting the digital number associated with the lower distribution cutoff from each of the plurality of pixels of imaging data when the digital number associated with the lower distribution cutoff is less than a predetermined maximum value. When the lower distribution cutoff is greater than the predetermined maximum value, the predetermined maximum value is subtracted from each of the plurality of pixels of imaging data.

In another embodiment, the contrast of a digital image is also enhanced by determining a median value of the input DNs, determining a target brightness value for the enhanced digital image, and adjusting each DN to generate an output DN, the median value of the output DNs being substantially equal to the target brightness value. When multiple bands of imaging data are present, the DNs of each band of imaging data are received from the plurality of imaging sensors. The median value of the received DNs is determined by processing the DNs of each of the bands of imaging data to determine a distribution of DNs for each of the plurality bands of imaging data, determining a median value of each of the distributions of DNs, and computing an average of the median values.

In another embodiment, the present invention provides a satellite image comprising a plurality of pixels each having a value determined by: determining a magnitude of spectral radiance of each a plurality of digital numbers of raw data pixels; processing the magnitudes of spectral radiance to determine a distribution of magnitudes of spectral radiance; and calculating the value of each of the plurality of pixels based on the distribution. The step of determining a magnitude of spectral radiance may include receiving a plurality of bands of pixels of imaging data from a plurality of imaging sensors, each pixel having a digital number representing the spectral radiance received by the associated imaging sensor, and determining a magnitude of spectral radiance for each of the digital numbers for each of the bands of pixels.

In another embodiment, the magnitude of spectral radiance is compensated for at least a portion of the digital numbers for any given band of the bands of pixels based on a known non-linear response of an imaging sensor associated with the spectral band. The compensated portion of the digital numbers are digital numbers which are greater than a digital number associated with a known response roll-off for the imaging sensor. When performing the compensation, it is first determined that a digital number for a given pixel of any given band is greater than a predetermined digital number. Second, the digital numbers associated with the pixel from the remaining bands are determined and a compensated digital number based on digital numbers from the other bands is computed.

In yet another embodiment, the present invention provides a method for transporting a color enhanced image towards an interested entity. The method comprises: conveying, over a portion of a computer network, an image that includes a plurality of pixels each having a value that has been determined based on a distribution of spectral radiance values associated with the plurality of pixels.

Still a further embodiment of the present invention provides a method for producing an enhanced digital image, comprising: receiving a plurality of pixels of imaging data from an imaging sensor; determining a magnitude of spectral radiance of each the plurality of pixels of imaging data; processing the magnitudes of spectral radiance to determine a distribution of magnitudes of spectral radiance for the plurality of pixels; adjusting the spectral radiance of each of the plurality of pixels based on the distribution to produce a path radiance adjusted value spectral radiance; processing the adjusted value spectral radiance for each of the plurality of pixels to determine an adjusted distribution for the plurality of pixels; assessing the adjusted distribution to determine a range of adjusted values and a median value of the range of adjusted values; and secondly adjusting the value of at least a subset of the plurality of pixels to create a second adjusted distribution wherein the median of the second adjusted distribution corresponds with a target median and the range of the second adjusted distribution corresponds with a target range.

DETAILED DESCRIPTION

The present invention provides a digital image that may be displayed with no further manipulation on the part of the customer or end user of the digital image. The present invention may also provide a set of quantitative surface-reflectance estimates that can be further processed by other automatic algorithms to yield specific kinds of information about the objects that have been imaged. When used to provide a digital image, a digital image collected at a satellite is spectral balanced and contrast stretched on a physical basis rather than a subjective one. A customer may use the image without additional tools, expertise, or time to perform complex digital image processing manipulations. In addition to serving the basic commercial customer, the present invention may be useful for the remote sensing expert to aid in their application. The present invention also provides an acceptable contrast stretch and spectral balance over a very wide variety of scene content. The algorithm uses known physical characteristics of the imaging sensors to estimate the actual spectral radiance measured by the satellite. A first order correction for major atmospheric effects is then applied. Finally a contrast stretch is applied to enhance the visual contrast of the image without disturbing the spectral balance. In this fashion the DRA algorithm automatically provides a visually appealing image based on standard human color perception principles.

Figure 1:
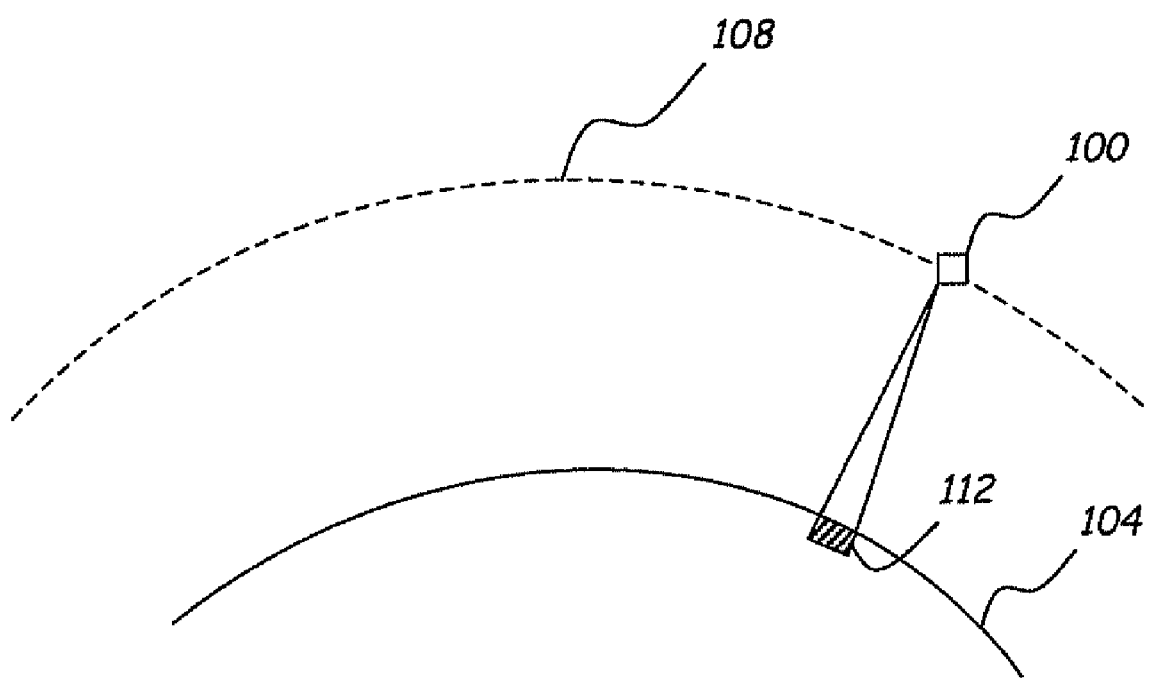
FIG. 1 is a diagrammatic illustration of a satellite in an earth orbit obtaining an image of the earth.

Having generally described the process for producing an image, various embodiments of the present invention are described in greater detail. Referring to FIG. 1, an illustration of a satellite 100 orbiting a planet 104 is described. At the outset, it is noted that, when referring to the earth herein, reference is made to any celestial body of which it may be desirable to acquire images or other remote sensing information. Furthermore, when referring to a satellite herein, reference is made to any spacecraft, satellite, and/or aircraft capable of acquiring images or other remote sensing information. Furthermore, the system described herein may also be applied to other imaging systems, including imaging systems located on the earth or in space that acquire images of other celestial bodies. It is also noted that none of the drawing figures contained herein are drawn to scale, and that such figures are for the purposes of discussion and illustration only.

As illustrated in FIG. 1, the satellite 100 orbits the earth 104 following orbital path 108. An imaging system aboard the satellite 100 is capable of acquiring an image 112 that includes a portion the surface of the earth 104. The image 112 is comprised of a plurality of pixels. Furthermore, the satellite 100 may collect images 112 in a number of spectral bands. In one embodiment, the imaging system aboard satellite 100 collects four bands of electromagnetic energy, namely, a red band, a green band, a blue band, and a near infrared band. Each band is collected by a separate imaging sensor that is adapted to collect electromagnetic radiation. Data from the sensors is collected, processed, and images are produced. Each band consists of digital numbers (DNs) on an 8-bit or 11-bit radiometric brightness scale. The DNs from each band are processed to generate an image that is useful for the application required by a user. Images collected from the satellite 100 may be used in a number of applications, including both commercial and non-commercial applications.

Figure 2:
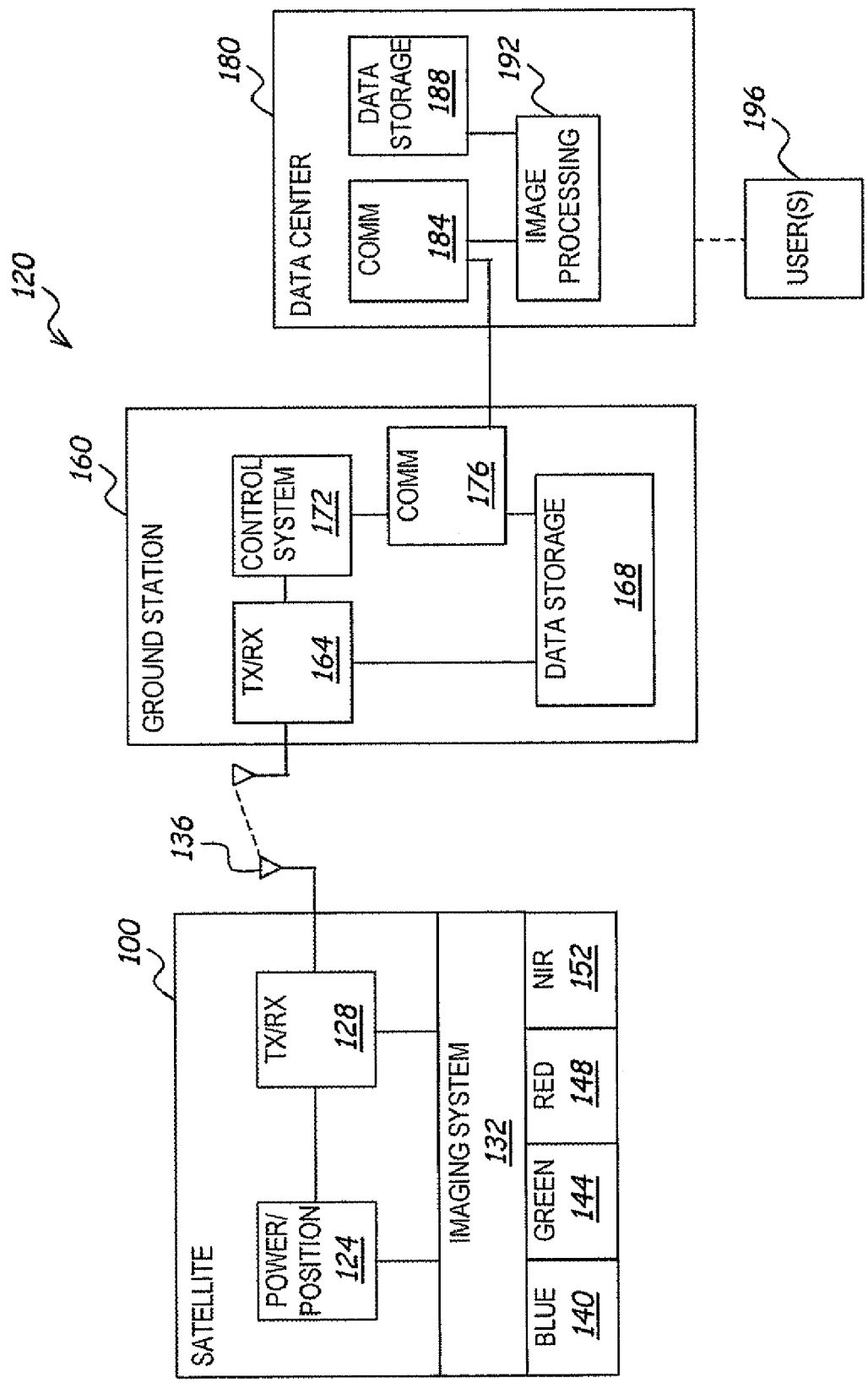
FIG. 2 is a block diagram representation of a system of an embodiment of the present invention.

Referring now to FIG. 2, a block diagram representation of an image collection and distribution system 120. In this embodiment, the satellite 100 includes a number of systems, including power/positioning systems 124, a transmit/receive system 128, and an imaging system 132. Such a satellite and associated systems 124 are well known in the art, and therefore are not described in detail herein as it is sufficient to say that the satellite 100 receives power and may be positioned to collect desired images and transmit/receive data to/from a ground location and/or other satellite systems. The imaging system 132, in is embodiment, includes four imaging sensors that collect electromagnetic energy received at the sensor within a band of electromagnetic energy. In this embodiment, the imaging system 132 includes a blue sensor 140, a green sensor 144, a red sensor 148, and a near-infrared (NIR) sensor 152. Each of these sensors 140-152 collect electromagnetic energy falling within preset energy bands that is received at the sensor. The imaging sensors 140-152, in this embodiment, include charge coupled device (CCD) arrays and associated optics to collect electromagnetic energy and focus the energy at the CCD arrays. The CCD arrays are configured to collect energy from a specific energy band by a mass of optical filters. The sensors 140-152 also include electronics to sample the CCD arrays and output a digital number (DN) that is proportional to the amount of energy collected at the CCD array. Each CCD array includes a number of pixels, and the imaging system operates as a pushbroom imaging system. Thus, a plurality DNs for each pixel are output from the imaging system to the transmit/receive system 128.

The satellite 100 transmits and receives data from a ground station 160. The ground station 160 of this embodiment includes a transmit/receive system 164, a data storage system 168, a control system 172, and a communication system 176. In one embodiment, a number of ground stations 160 exist and are able to communicate with the satellite 100 throughout different portions of the satellite 100 orbit. The transmit/receive system 164 is used to send and receive data to and from the satellite 100. The data storage system 168 may be used to store image data collected by the imaging system 132 and sent from the satellite 100 to the ground station 160. The control system 172, in one embodiment, is used for satellite control and transmits/receives control information through the transmit/receive system 164 to/from the satellite 100. The communication system 176 is used for communications between the ground station 160 and one or more data centers 180. The data center 180 includes a communication system 184, a data storage system 188, and an image processing system 192. The image processing system 192 processes the data from the imaging system 132 and provides a digital image to one or more user(s) 196. The operation of the image processing system 192 will be described in greater detail below. Alternatively, the image data received from the satellite 100 at the ground station 160 may be sent from the ground station 160 to a user 196 directly. The image data may be processed by the user using one or more techniques described herein to accommodate the user's needs.

Figure 3:
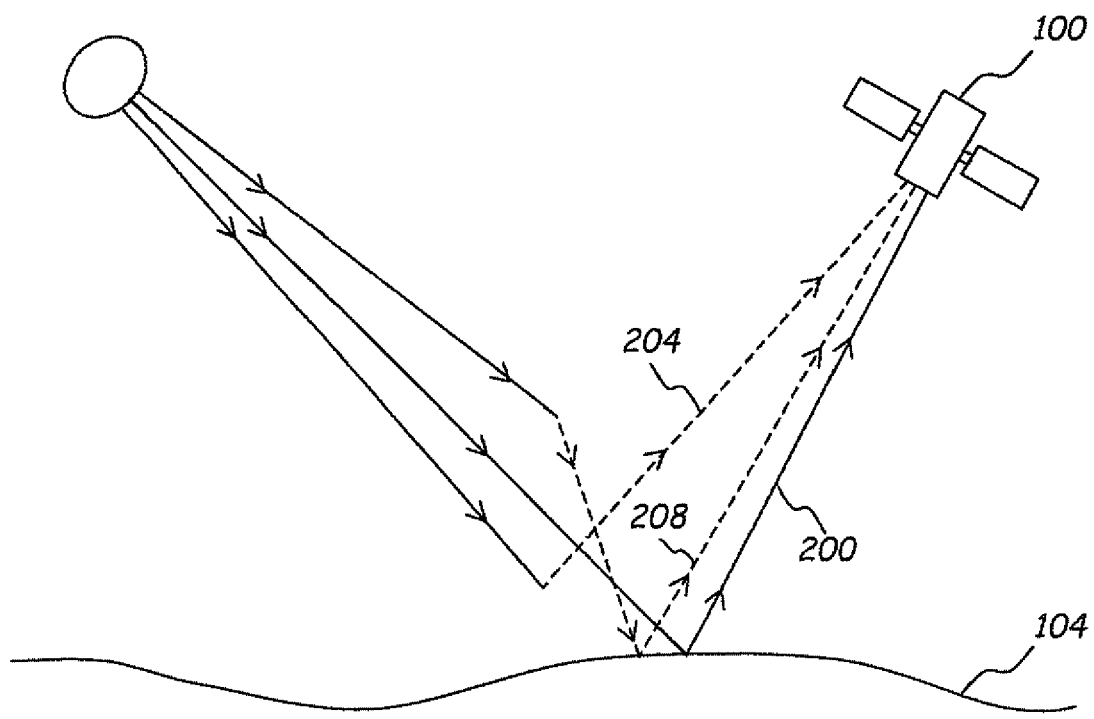
FIG. 3 is a diagrammatic illustration of light scattering through the earth atmosphere.

Referring now to FIG. 3, an illustration of an imaging system collecting sensing data is now described. The satellite 100, as illustrated in FIG. 3, receives radiation from the earth 104. The radiation received at the satellite 100 has three components. $L_{direct}$ 200 is the surface reflected attenuated solar radiation, $L_{upwelling}$ 204 is the up-scattered path radiance, and $L_{downwelling}$ 208 is the down scattered "sky" radiance that has been reflected by the surface into the sensor. Thus, the total radiation, $L_{total}$ received at the satellite 100 can be expressed as follows:

$$L_{total}(\lambda) = L_{direct}(\lambda) + L_{upwelling}(\lambda) + L_{downwelling}(\lambda)$$

where $\lambda$ indicates a dependence on wavelength. The three terms in this equation are the result of a complex radiative transfer process in the atmosphere as well as reflection by surface materials and $\lambda$ indicates a dependence on wavelength. Note that the $L_{upwelling}$ 204 and $L_{downwelling}$ 208 rays may undergo multiple scattering events before entering the sensor. Furthermore, atmospheric interactions may also include absorption of radiance.

The atmospheric scattering contributions, which effect the $L_{upwelling}$ 204 and $L_{downwelling}$ 208 terms, are generally governed by Rayleigh and Mie scattering. Rayleigh scattering is caused by the various molecular species in the atmosphere and is proportional to $\lambda^{-4}$. This is a selective scattering process that affects shorter wavelength radiances more than longer wavelength radiances. Because of the strong wavelength dependence of Rayleigh scattering, blue light (shorter wavelength) is scattered much more than red light (longer wavelength). This scattering mechanism generally causes the path radiance signal to be much higher in the blue channel 140 (FIG. 2) than in the near IR channel 152 (FIG. 2). Mie scattering is often called "aerosol" scattering. Similar to Rayleigh scattering, Mie scattering is also wavelength dependent (roughly proportional to $\lambda^{-1}$). Mie scattering is caused by scattering off large sized atmospheric constituents like smoke and haze. Both of these scattering mechanisms contribute to atmospheric scattering of electromagnetic radiation illustrated in FIG. 2.

Figure 4:
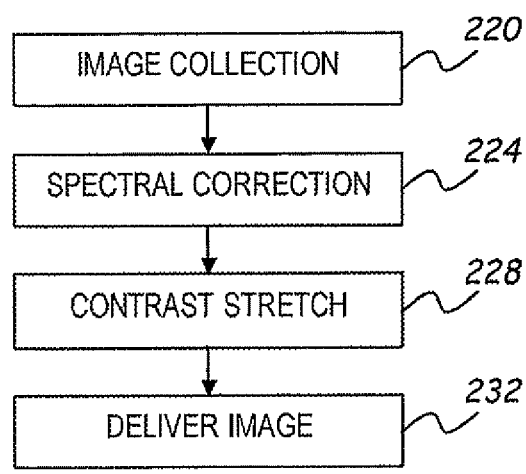
FIG. 4 is a flow chart illustration of the operational steps for collecting, processing and delivering a digital image for an embodiment of the present invention.

Referring now to FIG. 4, the operational steps performed in image collection, processing, and delivery are now described for an embodiment of the invention. Initially, as indicated at block 220, the image is collected. As discussed above with respect to FIG. 2, in an embodiment electromagnetic radiation is collected at an imaging system aboard a satellite, with the imaging system providing data related to the total radiance received at certain bands associated with certain sensors. The data provided by the imaging system is used to produce a digital image. This data, at block 224, is spectrally corrected. As discussed above, the color perceived by a user viewing an image produced from a satellite imaging system may be different than the color of an object that would be observed from a location relatively close to the object. This difference in perceived color is due to the reflected light received at the satellite imaging system being scattered through the atmosphere. The spectral correction of block 224, in an embodiment, adjusts the spectral balance of an image based on known sensor information and also further adjusts the spectral balance of an image in order to partially compensate for the atmospheric scattering of the light as it passes through the atmosphere. At block 228, the contrast of the image is stretched. The contrast stretch, in an embodiment, is used to provide additional perceived contrast between features within the image. At block 232, the image is delivered to one or more user(s) and/or application(s), referred to as a receiver. In one embodiment, the image(s) are transmitted to the receiver by conveying the images over the Internet. Typically, an image is conveyed in a compressed format. Once received, the receiver is able to display an image of the earth location having a visually acceptable color and contrast. It is also possible to convey the image(s) to the receiver in other ways. For instance, the image(s) can be recorded on a magnetic disk, CD, tape, solid-state memory, or other recording medium and shipped to the receiver. It is also possible to simply produce a hard copy of an image and then ship the hardcopy to the receiver. The hard copy can also be faxed, scanned, or otherwise electronically sent to the receiver.

Figure 5:
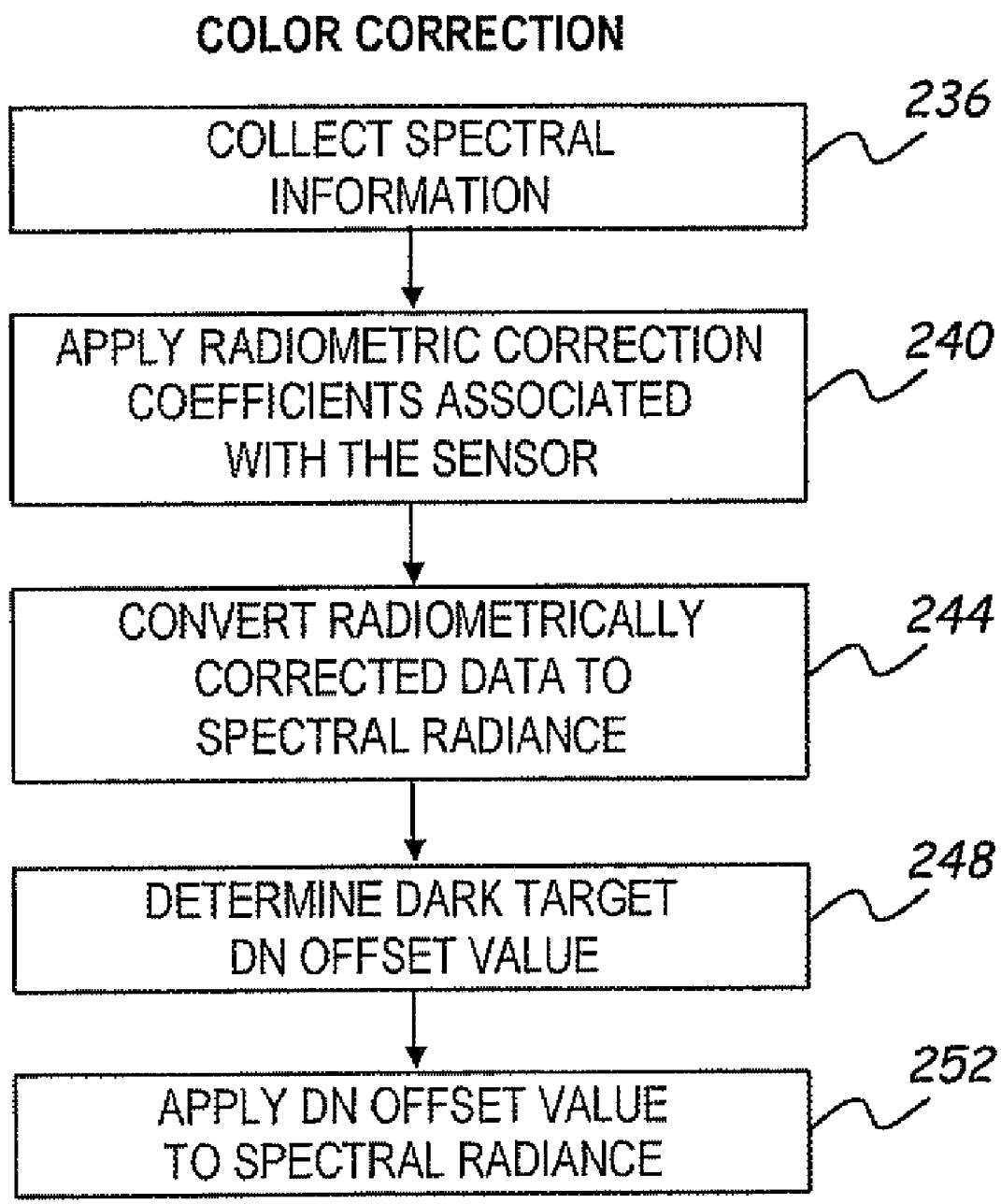
FIG. 5 is a flow chart illustration of the operational steps for color correction of a digital image for an embodiment of the present invention.

Referring now to FIG. 5, the operational steps for performing spectral correction are described for an embodiment of the present invention. Initially, at block 236, spectral information is collected. As noted previously, spectral information is collected, in an embodiment, using CCD detectors within an imaging system. Referring again to FIG. 2, the imaging system 132, comprises sensors 140-152 that comprise CCD detectors for each spectral band. The sensors 140-152 collect spectral information in their respective bands. The radiometric dynamic range of each image, in one embodiment, is 11 bits, although any dynamic range may be used. In this embodiment, the digital number produced from each element within a CCD detector has a range from 1 to 2047, with zeros used for backfill. As is understood, CCD detectors collect spectral information and output the digital number associated with the amount of spectral radiation received at the detector. Numerous methods exist for the collection and sampling of the spectral information within a CCD detector to produce the digital number, the details of which are well understood in the art.

Referring again to FIG. 5, following the collection of spectral information, radiometric correction coefficients associated with the sensor are applied to the spectral information, as noted at block 240. Within the imaging sensor, each CCD detector has a set of coefficients, called radiometric correction coefficients, which represent an approximate, though not always, linear response between the amount of spectral radiance received at the detector and the DN output of the detector. The response of each detector, even though they may be manufactured at the same time using the same technique, commonly differs from detector to detector. If left uncorrected the resulting image would contain bands and stripes corresponding to different responses from each detector. By applying the radiometric correction coefficients to the output of the detector the response of each detector is corrected. The process of correcting the response of each detector is termed "radiometric correction". In this process, a set of linear calibration coefficients (corresponding to a gain and a dark offset) are measured for each detector and then applied to the image data to provide consistency between detectors. In one embodiment, the calibration coefficients are estimated on a regular basis on-orbit using standard calibration techniques that are well known.

Following the radiometric correction, the next step in the spectral correction of imaging data is the conversion of the radiometrically corrected data to spectral radiance, as noted at block 244. As mentioned previously, imaging data is collected in several bands. This conversion is applied to each spectral band as follows:

$$L_{\lambda,TOA}(\text{band}) = DN(\text{band}) \cdot \frac{K(\text{band})}{\Delta(\text{band})} \left( \frac{W}{m^2 \cdot ster \cdot \mu m} \right)$$

where $L_{\lambda,TOA}$ (band) is the spectral radiance of the band, DN(band) is the radiometrically corrected Digital Number (DN) of the band, K(band) is the band integrated radiance conversion factor (W m$^{-2}$ ster$^{-1}$ DN$^{-1}$), and $\Delta$(band) is the effective bandwidth ($\mu$m) of the band. The K factors are factors that are provided for the imaging system and are described in more detail below. Once the correction listed in this equation is performed, the image data represents what the sensor measures, within radiometric error estimates. $L_{\lambda,TOA}$ is referred to as the Top Of Atmosphere (TOA) spectral radiance.

In one embodiment, the K factors are band dependant factors that convert the input corrected DN data to band integrated radiance (in units of W m$^{-2}$ sr$^{-1}$). When the K factor is divided by the effective bandwidth of the spectral channel, the result, which converts input DN's TOA spectral radiance, is termed the kappa factor. The kappa factor, since it is derived from the original k factor, is also band dependant.

An example of K-factors, effective bandwidths of the sensor channels, and kappa factors are listed in Table A-1.

TABLE A-1

Spectral Radiance Conversion Factors for spectral bands.

| Band | K factor (W m$^{-2}$ sr$^{-1}$) | $\Delta\lambda$, Effective Bandwidth ($\mu$m) | Kappa factor (W m$^{-2}$-sr$^{-1}$ $\mu$m$^{-1}$) |
|---|---|---|---|
| Blue | 1.604120e−02 | 0.068 | 0.2359 |
| Green | 1.438470e−02 | 0.099 | 0.1453 |
| Red | 1.267350e−02 | 0.071 | 0.1785 |
| NIR | 1.542420e−02 | 0.114 | 0.1353 |

The conversion of the radiometrically corrected DNs to $L_{\lambda,TOA}$ may thus also be performed by taking the product of kappa and the DN. The conversion to $L_{\lambda,TOA}$ is straightforward, however, because of the small magnitude of the kappa coefficients (Table A-1), the direct application of the kappa coefficients of this example to the DN data collapses the dynamic numeric range of the imagery data into a smaller range. In the example of Table A-1, an original DN of 2047 would convert to 482.9 (blue band), which, when handled as integer numbers, is equivalent to a loss of radiometric resolution if the data is kept in integer format.

In order to provide enhanced results, in one embodiment each kappa factor is converted to a dimensionless ratio, and these ratios are applied to the DN data. This process preserves the relative spectral balances among the bands and preserves, and may in some cases enhance, the radiometric range of the adjusted DN data. The transformed factors are termed "adjusted kappa" factors and are computed as follows:

$$Kappa_{AVE} = \frac{1}{\text{num\_bands}} \sum_{band} Kappa(\text{band})$$

$$Kappa_{ADJ} = \frac{Kappa(\text{band})}{Kappa_{AVE}}$$

Adjusted kappa factors using the example of table A-1 for each band are listed in table A-2. Note that they are non-dimensional.

TABLE A-2

Adjusted kappa factors for the spectral bands.

| Band | Adjusted Kappa |
|---|---|
| Blue | 1.452586 |
| Green | 0.894704 |
| Red | 1.099137 |
| NIR | 0.833128 |

Following the conversion to spectral radiance, the interaction of solar radiation with the atmosphere is taken into account. The atmospheric scattering contributions, which effect the $L_{upwelling}$ and $L_{downwelling}$ terms, as discussed above, are generally governed by Rayleigh and Mie scattering. In one embodiment, a full atmospheric correction may take into account all three terms of $L_{upwelling}$, $L_{downwelling}$, and $L_{direct}$. This is a relatively complex transformation, requiring an atmospheric radiative transfer model application such as MODTRAN. These programs provide a full radiative transfer model capable of modeling the interactions of radiant energy with the Earth's atmosphere to a high degree of accuracy if the physical state of the atmosphere is well known. This process is generally very time consuming owing to the complex nature of the desired correction and the accuracy is dependent on the exact knowledge of the atmospheric constituents for each scene.

In the embodiment of FIG. 5, as noted at block 248, a path radiance is estimated by noting the "dark target" DN value in each spectral band. This embodiment thus estimates the path radiance in each band. This DN then becomes a DN offset value. This offset is an estimate of the total amount of radiation entering the sensor that is not reflected into the sensor by the Earth's surface. An estimation of the DN associated with path radiance for each of the spectral bands of imaging data (blue, green, red, and NIR) is generated. At block 252, the DN offset value is applied to $L_{\lambda,TOA}$ to generate a path-corrected TOA spectral radiance. The path-corrected TOA spectral radiances of the scene in a given spectral band are obtained by subtracting the path-radiance value (the DN offset value) for that band from the total spectral radiances for that band. In this embodiment, spectral properties based on TOA path-corrected spectral radiances are similar to spectral properties based on the spectral radiances of surface materials observed just above the surface. The only property that changes significantly from surface to TOA is the overall intensity of the three bands. In other words, if an observer at TOA could see path-corrected spectral radiances of an object on the Earth, he or she would see similar colors from close range at the surface of the Earth (on a cloudless, relatively haze-free day with the same solar irradiance geometry).

In one embodiment, the dark target DN value is estimated automatically for each band by identifying the 0.1% point in the cumulative distribution histogram for the band. This low-end cutoff represents the first DN in the band where an appreciable signal from surface objects is measured, and it is an estimate of the path radiance contribution to the band. It should be noted that this low-end cutoff at the 0.1% point in the cumulative distribution histogram is merely one example of estimating the dark target DN value. Other points in the distribution may be selected, the dark target DN value may be manually selected by a user, or the point in the distribution may be dynamically adjusted based on the scene content and distribution histogram. The low-end cutoff point is computed with respect to the adjusted DN values of this embodiment. Subtracting out this adjusted DN value from each pixel is equivalent to subtracting out the path radiance contribution from the overall TOA spectral radiance.

Once the low-end cutoff point in the image cumulative distribution histogram is identified, the DN associated with the low-end cutoff is set as the dark target DN value, also referred to as DN_path(band). The Path Radiance Corrected (PRC) DN can be computed as follows:

$$DN\_path_{ADJ}(band) = DN\_path(band) \cdot Kappa_{ADJ}(band)$$

$$DN_{PRC}(band, pixel) = DNA_{ADJ}(band, pixel) - DN\_path_{ADJ}(band)$$

In one embodiment, the value of $DN\_path_{ADJ}(band)$ is determined for each spectral-band of imaging data. For example, if four bands of imagery are collected, a value is produced for $DN\_path_{ADJ}(band\_1)$, $DN\_path_{ADJ}(band\_2)$, $DN\_path_{ADJ}(band\_3)$, and $DN\_path_{ADJ}(band\_4)$ representing the blue-light, green-light, red-light, and NIR bands, respectively.

Each of these separately estimated $DN\_Path_{ADJ}(band)$ values is also related, in a direct linear way, to $L_{\lambda,TOA}$ through the straightforward application of the band-specific K_Factor (band) and A(band) coefficients. That is, $$L_{\lambda,TOA}(band\_1) = DN\_path_{ADJ}(band\_1) \times K\_Factor(band\_1)/\Delta(band\_1)$$

$$L_{\lambda,TOA}(band\_2) = DN\_path_{ADJ}(band\_2) \times K\_Factor(band\_2)/\Delta(band\_2)$$

$$L_{\lambda,TOA}(band\_3) = DN\_path_{ADJ}(band\_3) \times K\_Factor(band\_3)\Delta(band\_3)$$

$$L_{\lambda,TOA}(band-4) = DN\_path_{ADJ}(band\_4) \times K\_Factor(band\_4)/\Delta(band\_4)$$

As discussed above, the combination of K_Factor/Δ is referred to as the kappa factor.

Using the example from Table A-1, values of kappa for each band are:

KAPPA_1=0.2359 Watts per square meter per steradian per micrometer per DN

KAPPA_2=0.1453 Watts per square meter per steradian per micrometer per DN

KAPPA_3=0.1785 Watts per square meter per steradian per micrometer per DN

KAPPA_4=0.1353 Watts per square meter per steradian per micrometer per DN

In turn, each $L_{\lambda,TOA}(band)$ value can be converted to an apparent reflectance factor at the top of the atmosphere (RFTOA), as seen by an observer (RFTOA_path_band).

To calculate a value of RFTOA from each value of $L_{\lambda,TOA}$, three items of information are required:

The spectral irradiance of the sun at TOA (SISUNTOA),

The elevation angle, in degrees, of the sun (SUNELEV), and

The earth-sun distance, in Astronomical Units (A.U.), (D)

SISUNTOA is a known constant for each spectral band. SUNELEV and D are the same for each spectral band. SUNELEV varies from place to place on the earth and from date to date (day of year, DOY). D varies with DOY only.

With these parameters, the conversion equation from SRTOA to RFTOA is as follows:

$$RFTOA = L_{\lambda,TOA} \times pi \times D \times D \times 100\% / [SISUNTOA \times SIN(SUNELEV)]$$

where pi=3.1415927 . . . .

Values of SISUNTOA for each band are, in one example:

SISUNTOA_1=1930.11 Watts per square meter per micrometer

SISUNTOA_2=1842.47 Watts per square meter per micrometer

SISUNTOA_3=1561.61 Watts per square meter per micrometer

SISUNTOA_4=1097.64 Watts per square meter per micrometer

In one embodiment, larger errors are associated with the estimation of $DN\_path_{ADJ}(band\_4)$ than for the other $DN\_path_{ADJ}(band)$ values. This is due to the fact that in some scenes, there are no non-reflecting surface objects in the NIR. But, in the other bands, especially in the red-light band, dark (non-reflecting) objects are commonly present in a scene, namely, dense green vegetation. RFTOA generally decreases with wavelength from Band 1 to Band 4. However, due to the various conversion factors (i.e., KAPPA and SISUNTOA), the relative values of $DN\_path_{ADJ}(band)$ will normally not exhibit any such simple pattern of decrease with wavelength. However, since D and SIN(SUNELEV) are the same for all bands (i.e., wavelength does not affect these), the ratio of RFTOA_path_4 divided by RFTOA_path_3, called RFRATIO43, is related to the ratio of DN_path_4 divided by DN_path_3, called DNRATIO43, in a fixed way, as follows:

$$RFRATIO43 = DNRATIO43 \times 1.078381$$

Inversely, $$DNRATIO43 = 0.927316 \times RFRATIO43$$

It is generally expected that RFRATIO43 is 0.8 or less. If RFRATIO43 is greater than 0.8, then, in one embodiment, it is assumed that the RFTOA_path_4 value is too high, and that no totally absorbing body was present in the scene as seen in the NIR band. In this case, in one embodiment, an estimate is selected as the value of RFTOA_path_4 as:

$$RFTOA\_path\_4\_better = RFTOA\_path\_4 \times 0.8$$

In terms of $DN\_path_{ADJ}$ values, DNRATIO43 is normally 0.741853 or less in an embodiment. If DNRATIO43 is greater than this value, an estimate is selected as the value of $DN\_path_{ADJ}(band\_4)$ as:

$$DN\_path_{ADJ}\_better(band\_4) = DN\_path_{ADJ}(band\_3) \times 0.741853$$

In a scene with 100% cloud cover, as is often processed by the processing system, the above method identifies a path radiance equivalent (low-end) DN value that is much too high, resulting in an incorrect spectral transformation. To avoid this problem, in one embodiment, path radiance values are not allowed to exceed to an absolute maximum value. A value of 400 DNs (11 bit input data) is set as the maximum path radiance value for every band in one embodiment, although a different value may be used so long as the spectral transformation is acceptable. Actual values of path-radiance DNs are not the same for all bands and tend to be higher for blue light and green light than for red light and NIR. Nevertheless, under cloudy conditions, actual scene DNs are generally quite high (above 1500). In such cases, minor differences among path-radiance DN estimates have relatively small effects on the perceived color of the transformed imagery.

In one embodiment, a Look Up Table (LUT) is computed for each band corresponding to the $DN_{PRC}$. The $DN_{PRC}$ values are generated on a band specific basis using the above equations. The $DN_{orig}$ value in the equations is simply in the integer range of the input data such as 1-2047 for 11 bit data, and 1-255 for 8 bit data. In this embodiment, intermediate computations are kept in floating point format to avoid round off and overflow errors during the calculation. Also, the results of the LUT are not allowed to exceed the allowed range of the output DN values. This can be accomplished by testing the DN value for values that fall below 1 or above the maximum DN output, and resetting the value to 1 or to the maximum accordingly.

Figure 6:
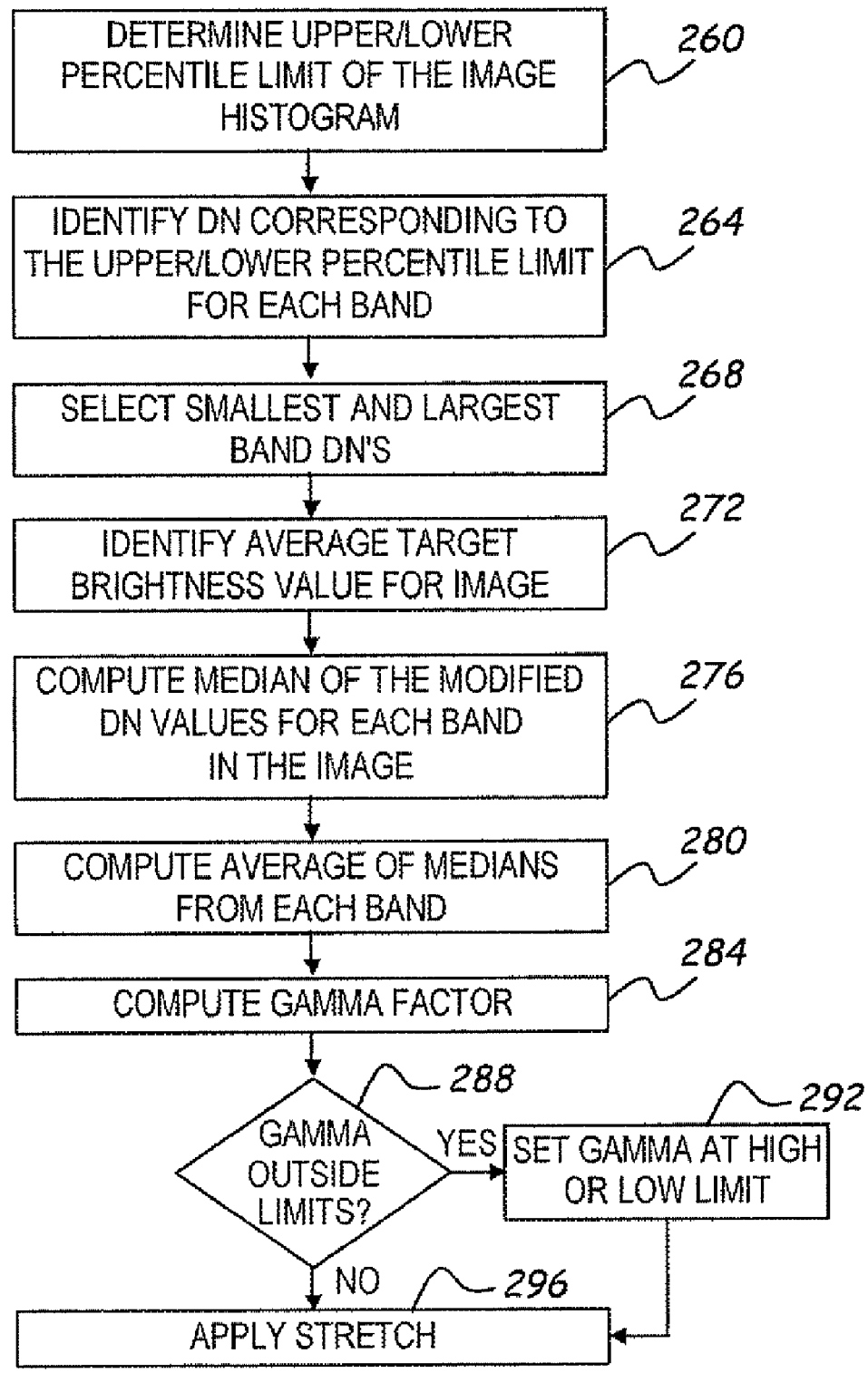
FIG. 6 is a flow chart illustration of the operational steps for contrast enhancement of a digital image for an embodiment of the present invention.

Once the data has been converted to TOA path-radiance corrected spectral radiances, the visual contrast is enhanced to facilitate visual interpretation of the imagery. FIG. 6 illustrates the operational steps for enhancing contrast for one embodiment of the present invention. The contrast enhancement technique of this embodiment differs from many COTS contrast stretches in that it is a color-hue-and-color-saturation preserving contrast stretch. The color preservation property of this stretch is beneficial since the spectral correction operations previously described are designed to correct the imagery in terms of hue and saturation. Thus, the desire in making contrast improvements is to only increase its brightness (intensity) while not affecting the color-hue or color-saturation.

Referring to FIG. 6, initially, a determination is made, noted at block 260, for the upper and lower percentile limits of the of the image histogram for each band. In one embodiment, the lower percentile limit is set to 1% of the cumulative distribution of the image histogram, and the upper percentile limit is set to 99% of the cumulative distribution of the image histogram. Any percentile cutoff can be used for this determination, such as 2%, which corresponds to the 98% point in the cumulative histogram. However, a 2% cutoff may cut off too much of the upper end of the DN histogram, resulting in significant loss of detail over bright objects. In such a situation, a 0.5 percentile cutoff may be used, which corresponds to the 0.5% and 99.5% points in the image histogram. As will be understood, any value for the percentile cutoff may be used and, in one embodiment, the contrast enhancement algorithm is implemented with these parameters as configurable values that may be configured by a user.

At block 264, the DN corresponding to the upper and lower percentile limits for each band are identified. The cutoff value of the upper DN (hi_dn) and lower DN (lo_dn$_{ADJ}$) is selected at block 268. The selection is made by first identifying the highest DN corresponding to the high percentile cutoff for each band in the image, and the largest of these values is selected at block 268. Similarly, the selection of lo_dn is made by identifying the lowest DN corresponding to the lower percentile cutoff for all bands in the image. The values of hi_dn and lo_dn are selected, in this embodiment, according to the following equations:

hi_dn=MAX(hi_dn(band))

lo_dn=MIN(lo_dn(band))

Once the values of hi_dn and lo_dn are identified, they are then converted to adjusted DNs using the following equations:

hi_dn$_{ADJ}$=hi_dn×Kappa(band)/Kappa$_{AVE}$ lo_dn$_{ADJ}$=lo_dn×Kappa(band)/Kappa$_{AVE}$ The value of the band used in the above equations is the band that contains the hi_dn and the band that contains lo_dn, respectively.

At block 272, the average target brightness value for the image is identified. The value of the average target brightness has a significant impact on the visual appearance of the image, and is often open to subjective interpretation. Thus, in an embodiment, the value of the average target brightness is configurable by a user. In other embodiments, the value is the average target brightness is preset to a value that is likely to produce a visually acceptable image. At block 276, the median of the modified DN values for each band in the image is computed. This median is computed by determining the median value of the cumulative image histogram for each band. At block 280, the average of the medians from each band is computed. In one embodiment the average of the medians from each band is computed according to the following equation:

$$\text{avg\_median\_dn} = \frac{1}{nbands} \sum_{band=1}^{nbands} \text{median(band)}$$

where median(band) indicates the median value of the original image for the given band. Following the computation of the average of the medians for each band, a gamma factor (G) is computed, according to block 284. The value of G is determined by using the average target brightness value for the image and computing the value of G needed to bring the overall median brightness of the image up to the target brightness value. In one embodiment, G is computed based on the desired target brightness and the average brightness according to the following equation:

$$G = \frac{\log\left(\frac{\text{avg\_median\_dn} - \text{lo\_dn}}{\text{hi\_dn}}\right)}{\log\left(\frac{\text{trgt\_dn}}{\text{max\_dn}}\right)}$$

where avg_median_dn is the average of the median modified DN values for each band in the image; max_dn is the maximum DN value of the image output (i.e. 255 for 8-bit products or 2047 for 11-bit products); and trgt_dn is the DN value of the target brightness in the image.

In the embodiment of FIG. 6, the value of gamma is limited to ensure that an exaggerated stretch is not applied to the imagery. At block 288, it is determined if the value of gamma is outside of these limits. If the value of gamma is outside the limits, the value for gamma is set at the appropriate high or low limit, as noted at block 292. In one embodiment, gamma values are set to have a limit of no greater than 2.0 and no less than 0.5. In other embodiments, these limits are implemented as ran-time configurable values. Following the determination of the gamma value, the stretch is applied, as noted at block 296. The stretch equation, in an embodiment, is:

$$DN_{stretch}(\text{band, pixel}) = \left[\frac{DN_{PRC}(\text{band, pixel}) - \text{lo\_dn}_{ADJ}}{\text{hi\_dn}_{ADJ} - \text{lo\_dn}_{ADJ}}\right]^{1/G} \times \text{hi\_value}$$

where $DN_{PRC}$ is the TOA path radiance corrected DN, lo_dn$_{ADJ}$ is the lowest cutoff from all the bands, hi_dn$_{ADJ}$ is the highest cutoff from all the bands, G is the gamma factor, and hi_value is the maximum DN desired in the output image. The stretch equation is applied to each pixel in each band to produce a stretched DN value for the pixel. This technique increases the intensity of each channel without materially changing the hue and saturation of the imagery. The resulting image product maintains the correct spectral balance of the imagery while providing an acceptable level of contrast enhancement. The result is a visually appealing image that requires no manipulation for proper display. The results of the algorithm generally do not depend on scene content, and interpretation of the product requires little or no experimentation or "guessing" by the remote sensing analyst.

In one embodiment, as mentioned above, a lookup table is used to determine a path radiance corrected DN for each pixel in a band. In this embodiment, the original pixel values (for each band) are read in from the original image. These DNs are used as an index into the $DN_{PRC}$ lookup tables to retrieve the value of $DN_{PRC}$ in the stretch equation. The stretch is then applied and the pixel value is written out to the image. In one embodiment, the value of the DN for each pixel is evaluated to verify that the DN value is not outside of certain limits following the application of the stretch equation. For example, if the DNprc-lo_dn is less than 0, then DNstretch is set to 1. In this embodiment, the DN value of zero is reserved for blackfill. Similarly, if DNprc is greater than the hi_value, then DNstretch is set to be the hi_value.

Figure 7:
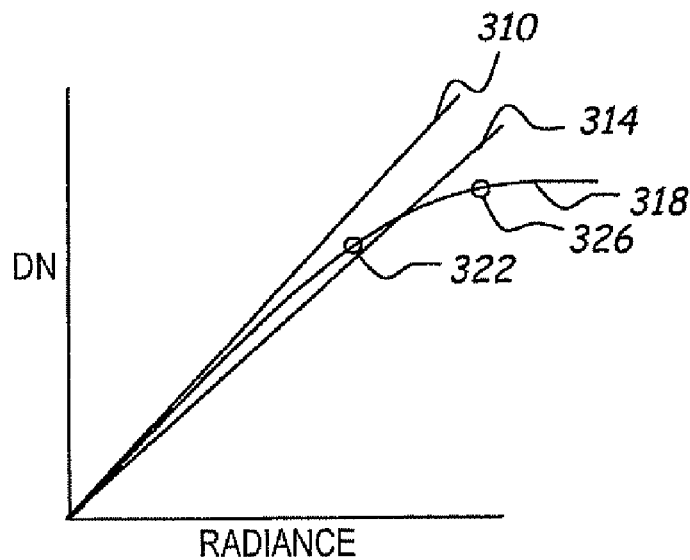
FIG. 7 is a diagrammatic illustration of linear and non-linear sensor responses for different imaging sensors.

In another embodiment of the present invention, spectral compensation may be generated for known imaging sensor non-linearities. As is known, each band of imagery has an associated imaging sensor that receives radiance from the particular band of interest. In some cases, the sensor may have a non-linear response, and provide DN values that reach a maximum limit when the amount of radiance received at the sensor is above a threshold limit. Referring to FIG. 7, the output of three spectral bands is illustrated as a function of radiance received at the sensor associated with the respective spectral band. In this example, a first band has a linear response throughout the full range of DNs, as indicated by line 310. Similarly, a second band also has a linear response throughout the full range of DNs, as indicated by line 314. However, a third band has a non-linearity, as indicated by line 318. In this example, the third band has a linear response up to a certain amount of radiance received, and the output of the sensor is non-linear beyond this points. This point is referred to herein as a roll-off point, and is indicated at point 322 in FIG. 7. In the example of FIG. 7, the third sensor reaches a maximum output at point 326, after which the output of the sensor is the same DN regardless of any additional radiance received at the sensor. The output of the non-linear sensor is corrected in one embodiment using a technique referred to as "spectral feathering."

Figure 8:
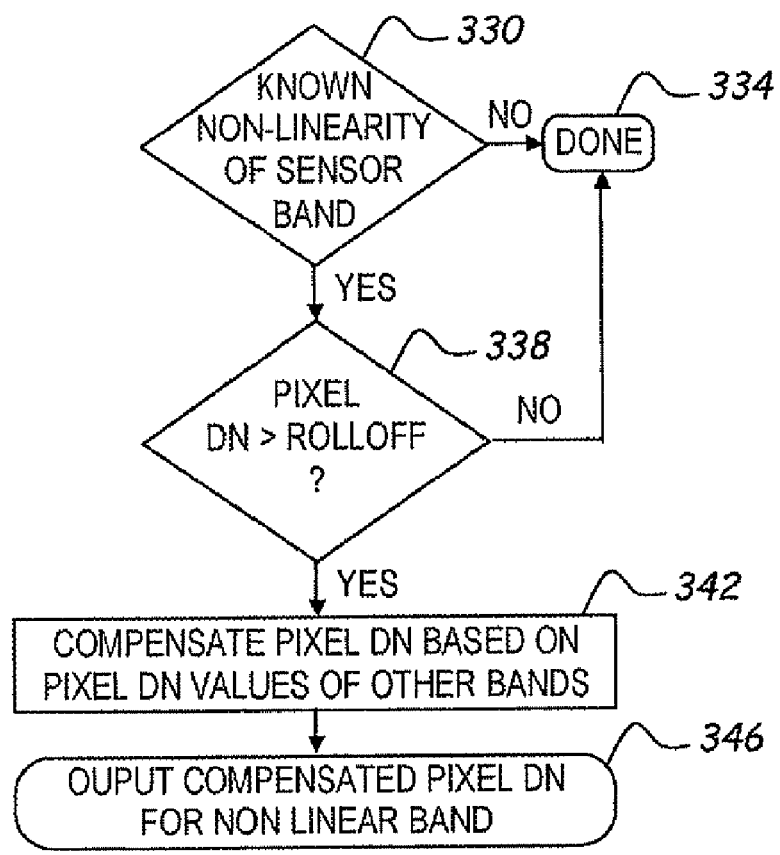
FIG. 8 is a flow chart illustration of the operational steps for compensation of a known sensor non-linearity for an embodiment of the present invention.

In an embodiment, spectral feathering is performed according to the flow chart illustration of FIG. 8. Initially, at block 330, is it determined if there is a known non-linearity of a sensor band. If there is no known non-linearity, no compensation is required, and the operations are complete, as indicated at block 334. If there is a known non-linearity, it is determined if the pixel within the band has a DN value that is greater than the DN value associated with the roll-off point, as noted at block 338. If the pixel value is less than the roll-off value, no compensation is required and the operations are done as noted at block 334. If the pixel DN value is greater than the roll-off value, the DN value of the pixel is compensated based on the pixel DN values of the other bands, as indicated at block 342. In one embodiment, the compensated pixel value is computed based on an average of the remaining bands DN values. Following the compensation, the compensated pixel DN value is output for the non-linear band, as indicated at block 346.

In one embodiment, a spectral band (denoted by "band") has a known non-linearity. In this embodiment, for a particular pixel (denoted by "pixel"), it is determined if the DN value of the pixel in the band is greater than the rolloff value for the band (denoted by "band_rolloff"). If so, the pixel requires spectral compensation. In this case, first, the amount of compensation required to adjust the pixel is determined as follows:

$$\text{fraction} = \frac{\text{band\_lmt} - \text{input\_dn(pixel, band)}}{\text{band\_lmt} - \text{band\_rolloff}}$$

where band_lmt is the DN value beyond which the sensor becomes non-linear, band_rolloff is the DN corresponding to the beginning of the non-linear behavior, and input_dn(pixel, band) indicates the DN value associated with the given pixel in the band that requires compensation. The values of fraction are bounded as follows to provide a numerically consistent result:

if (fraction<0) then fraction=1 if (fraction>1) then fraction=1

Physically the value of fraction represents how much compensation is to be applied to the pixel. A value of zero indicates no compensation, while a value of one indicates full compensation. In order to compensate the pixel for any known non-linearity of detector response, pixel values from adjacent spectral bands are used. The average output value of the adjacent spectral bands is computed according to the following equation:

$$\text{ave\_dn\_out} = \frac{\text{output\_dn(pixel, band} + 1) + \text{output\_dn(pixel, band} - 1)}{2.0}$$

where output_dn(pixel,band+1) indicates the output DN value of the spectrally adjacent band of longer wavelength than the band to be compensated, and output_dn(pixel,band−1) indicates the output DN value of the spectrally adjacent band of shorter wavelength than the band to be compensated. In the situation where the band to be compensated does not lie spectrally between any sensor bands, two bands of either longer or shorter wavelength than the band to be compensated may be used. The final compensated pixel value is determined as follows:

comp_value(pixel,band)=output_value(pixel,band)× (1−fraction)+ave_dn_out*fraction where output_value(pixel,band) is the uncompensated DN corresponding to the pixel in the band that requires compensation, fraction is computed above, and ave_dn_out is computed above. In this manner the pixel value is spectrally compensated in a smoothly varying manner using spectral information from adjacent spectral bands. This technique is referred to as "spectral feathering."

While the invention has been particularly shown and described with reference to a preferred embodiment thereof, it will be understood by those skilled in the art that various other changes in the form and details may be made without departing from the spirit and scope of the invention.

What is claimed is:

1. A method for enhancing an image generated using an imaging system, the imaging system comprising a plurality of imaging sensors, including a first imaging sensor and a second imaging sensor, the method comprising:
   receiving a first digital number at an image correction system, wherein the first digital number is a representation of a brightness value of a pixel for the first imaging sensor;
   receiving a second digital number at the image correction system, wherein the second digital number is a representation of a brightness value of the pixel for the second imaging sensor;
   determining, using the image correction system and the first digital number, whether to correct for a non-linear response of the first sensor to an amount of radiance received by the first sensor, wherein said determining comprises identifying a roll-off point for the first sensor, wherein the first sensor has a substantially non-linear response to an amount of radiance it receives after the roll-off point is met; and
   generating, using the image correction system, a final digital number based on the first digital number and the second digital number, wherein the final digital number is a corrected representation of the brightness value of the pixel for the first imaging sensor, wherein said generating step is performed if the first digital number has a value greater than a digital number associated with the roll-off point.

2. The method of claim 1, further comprising replacing the first digital number with the final digital number.

3. The method of claim 1, further comprising using the imaging system to create the first digital number in response to an amount of radiance received by the first sensor.

4. The method of claim 1, wherein the final digital number is based on digital numbers generated by the plurality of imaging sensors other than the first sensor.

5. The method of claim 4, wherein generating the final digital number further comprises: calculating a ratio corresponding to an amount of compensation for the first digital number;
   calculating an average of the digital numbers generated by the plurality of imaging sensors other than the first sensor; and
   calculating the final digital number based on the ratio and the average.

6. A method for enhancing an image generated using an imaging system, the imaging system comprising a plurality of imaging sensors, including a first imaging sensor and a second imaging sensor, the method comprising:
   receiving a first digital number at an image correction system, wherein the first digital number is a representation of a brightness value of a pixel for the first imaging sensor;
   receiving a second digital number at the image correction system, wherein the second digital number is a representation of a brightness value of the pixel for the second imaging sensor; and
   generating, using the image correction system, a final digital number based on the first digital number and the second digital number, wherein the final digital number is a corrected representation of the brightness value of the pixel for the first imaging sensor and is based on digital numbers generated by the plurality of imaging sensors other than the first sensor;
   wherein generating the final digital number further comprises:
   calculating a ratio corresponding to an amount of compensation for the first digital calculating an average of the digital numbers generated by the plurality of imaging sensors other than the first sensor; and
   calculating the final digital number based on the ratio and the average,
   wherein the ratio is defined by the following formula:

$$\text{ratio} = \frac{\text{band\_lmt} - \text{first\_digital\_number}}{\text{band\_lmt} - \text{rolloff\_point}}$$

wherein band_lmt is a maximum digital number output by the first sensor, regardless of an amount of radiance received by the first sensor, first_digital number is the first digital number, and rolloff_point is a digital number representing a roll-off point for the first sensor, wherein the first sensor has a substantially non-linear response to an amount of radiance it receives after the roll-off point is met.

7. The method of claim 6, wherein, if the computed value of the ratio is greater than 1 or less than 0, then the value of the ratio is changed to 1.

8. The method of claim 6, wherein the average is defined by the following formula:

$$\text{average} = \frac{\text{output\_dn(pixel, band} + 1) + \text{output\_dn(pixel, band} - 1)}{2.0}$$

wherein band is a spectral band sensed by the first sensor, output dn(pixel, band+1) is a digital number corresponding to the pixel that is output by a sensor for a band with a longer wavelength than band, and output dn(pixel, band−1) is a digital number corresponding to the pixel that is output by a sensor for a band with a shorter wavelength than band.

9. The method of claim 8, wherein the final digital number is calculated according to the following formula:

final_digital_number=first_digital_number*(1−ratio)+average*ratio.

10. The method of claim 1, further comprising applying, using the image correction system, a same contrast enhancement stretch to each pixel in each band of the image to produce an image with enhanced contrast and maintained color balance.

11. An image comprising a pixel having a digital number provided by:
   receiving a first digital number for the pixel generated in response to radiance received by a first imaging sensor, wherein the first sensor is part of an imaging system comprising a plurality of imaging sensors;
   determining, using an image correction system and the first digital number, whether to correct for a non-linear response of the first sensor to the amount of radiance received; and
   generating, using the image correction system, if it is determined to correct for the response of the first sensor, a final digital number for the pixel based on the first digital number and a second digital number, wherein the second digital number is generated in response to radiance received by a second imaging sensor of the imaging system;
   wherein said determining comprises:

identifying a roll-off point for the first sensor, wherein the first sensor has a substantially non-linear response to the amount of radiance it receives after the roll-off point is met; and deciding to perform said generating step if the first digital number has a value greater than a digital number associated with the roll-off point.

12. The image of claim 11, wherein the final digital number is based on digital numbers generated by the plurality of imaging sensors other than the first sensor.

13. The image of claim 12, wherein generating the final digital number further comprises: calculating a ratio corresponding to an amount of compensation for the first digital number;

calculating an average of the digital numbers generated by the plurality of imaging sensors other than the first sensor; and calculating the final digital number based on the ratio and the average.

14. An image enhancement system comprising:

a transmit/receive system configured to receive a first digital number generated in response to radiance received by a first imaging sensor, wherein the first sensor is part of an imaging system comprising a plurality of imaging sensors; and an image correction system in communication with the transmit/receive station and configured to:

identify a roll-off point for the first sensor, wherein the first sensor has a substantially non-linear response to the amount of radiance it receives after the roll-off point is met;

determine whether to correct for a non-linear response of the first sensor to the amount of radiance received; and generate, if it is determined to correct for the response of the first sensor, a final digital number based on the first digital number and a second digital number, wherein the second digital number is generated in response to radiance received by a second imaging sensor of the imaging system, wherein it is determined to correct for a non-linear response of the first sensor to the amount of radiance received if the first digital number has a value greater than a digital number associated with the roll-off point.

15. The image enhancement system of claim 14, wherein the final digital number is based digital numbers generated by the plurality of imaging sensors other than the first sensor.

16. The image enhancement system of claim 15, wherein generating the final digital number further comprises:

calculating a ratio corresponding to an amount of compensation for the first digital number;

calculating an average of the digital numbers generated by the plurality of imaging sensors other than the first sensor; and calculating the final digital number based on the ratio and the average.

* * * * *

UNITED STATES PATENT AND TRADEMARK OFFICE
CERTIFICATE OF CORRECTION

PATENT NO. : 7,715,651 B2  Page 1 of 1
APPLICATION NO. : 12/463797
DATED : May 11, 2010
INVENTOR(S) : Chris Padwick et al.

It is certified that error appears in the above-identified patent and that said Letters Patent is hereby corrected as shown below:

In column 18, lines 1 and 2 replace claim 6 with --calculating a ratio corresponding to an amount of compensation for the first digital number;--
Begin line 3 with --calculating an average of the digital numbers generated by the plurality of imaging sensors other than the first sensor; and--

In column 18, lines 13 through 20 replace claim 6 with --wherein band_lmt is a maximum digital number output by the first sensor, regardless of an amount of radiance received by the first sensor, first_digital_number is the first digital number, and rolloff_point is a digital number representing a roll-off point for the first sensor, wherein the first sensor has a substantially non-linear response to an amount of radiance it receives after the roll-off point is met.--

In column 18, lines 33 through 39 replace claim 8 with --wherein band is a spectral band sensed by the first sensor, output_dn(pixel, band+1) is a digital number corresponding to the pixel that is output by a sensor for a band with a longer wavelength than band, and output_dn(pixel, band-1) is a digital number corresponding to the pixel that is output by a sensor for a band with a shorter wavelength than band.--

Signed and Sealed this

Twenty-seventh Day of July, 2010

David J. Kappos
*Director of the United States Patent and Trademark Office*